(12) United States Patent
Howland et al.

(10) Patent No.: US 6,299,066 B1
(45) Date of Patent: Oct. 9, 2001

(54) MARKED CARD READER EMPLOYING AFOCAL SPATIAL FILTERING

(75) Inventors: David R. Howland, Aptos; Henry W. Cassady, Santa Cruz, both of CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/522,337

(22) Filed: Mar. 9, 2000

Related U.S. Application Data

(63) Continuation of application No. 09/059,678, filed on Apr. 13, 1998, now abandoned.
(60) Provisional application No. 60/043,099, filed on Apr. 16, 1997.

(51) Int. Cl.$^7$ ................................ G02B 5/00; G06K 7/10
(52) U.S. Cl. ................................ 235/462.32; 235/462.42
(58) Field of Search .................... 235/462.32, 462.42, 235/462.01, 454

(56) References Cited

U.S. PATENT DOCUMENTS

| | | |
|---|---|---|
| 3,904,079 | 9/1975 | Kross . |
| 3,983,364 | 9/1976 | Firehammer et al. ............... 235/61.6 |
| 4,153,895 | 5/1979 | Weisbrod et al. .................. 340/146.3 |
| 4,578,569 | 3/1986 | Arp et al. ............................ 235/454 |
| 4,681,548 | 7/1987 | Lemelson ............................ 434/311 |
| 4,831,242 | 5/1989 | Englehardt et al. ................. 235/382 |
| 4,900,907 | 2/1990 | Matusima et al. ................... 235/472 |
| 5,001,330 | 3/1991 | Koch .................................... 235/436 |
| 5,053,612 | * 10/1991 | Pielemeier et al. .................. 235/462 |
| 5,225,977 | 7/1993 | Hooper et al. ........................ 364/401 |
| 5,319,182 | 6/1994 | Havens et al. ........................ 235/462 |
| 5,350,909 | 9/1994 | Powell et al. ..................... 235/462 X |
| 5,387,785 | 2/1995 | Gatto et al. ........................... 235/454 |
| 5,390,385 | 2/1995 | Beldham . |
| 5,392,618 | 2/1995 | Livingston et al. . |
| 5,399,845 | 3/1995 | Manucy, III ......................... 235/454 |
| 5,404,893 | 4/1995 | Brady et al. ............................ 134/18 |
| 5,416,308 | 5/1995 | Hood et al. ........................... 235/454 |
| 5,500,050 | 3/1996 | Chan et al. . |
| 5,564,595 | 10/1996 | Minnissian . |
| 5,585,616 | * 12/1996 | Roxby et al. ......................... 235/472 |
| 5,644,119 | 7/1997 | Padula et al. ........................ 235/384 |
| 5,697,699 | * 12/1997 | Seo et al. ......................... 235/472 X |
| 5,711,673 | 1/1998 | Grundy, Jr. ........................... 434/353 |
| 5,756,981 | * 5/1998 | Roustaei et al. ..................... 235/462 |
| 5,796,087 | 8/1998 | Hazama ................................ 235/462 |

OTHER PUBLICATIONS

U.S. Ser. No. 09/061,530, Howland et al., filed Apr. 13, 1998.

\* cited by examiner

*Primary Examiner*—Karl D. Frech
(74) *Attorney, Agent, or Firm*—Townsend and Townsend and Crew LLP

(57) ABSTRACT

A marked card reader having a lensless optical detection system with fixed angle illumination and detection, the sensitivity of which is independent of the frequency response associated therewith. The optical detection system includes a radiation source to produce radiation and a radiation detector. A target plane is positioned so that the radiation source directs radiation toward the target plane. The detection source is positioned to sense radiation reflected from the target plane. An optically opaque body is positioned between the optical detector and the radiation source to prevent incident radiation from be sensed by the optical detector.

20 Claims, 7 Drawing Sheets

MARKED CARD READER EMPLOYING AFOCAL SPATIAL FILTERING

CROSS REFERENCE TO RELATED APPLICATIONS

This application is a continuation of U.S. patent application Ser. No. 09/059,678 abandoned, entitled "MARKED CARD READER," filed Apr. 13, 1998, naming as inventors David R. Howland and Henry W. Cassady, which is in turn a nonprovisional application of U.S. provisional patent application "CHEMICAL DISPENSING SYSTEM USING KEYBOARDLESS DATA ENTRY," U.S. Ser. No. 60/043,099, filed Apr. 16, 1997, having David R. Howland and Henry W. Cassady listed as co-inventors and assigned to Nova Controls. The Ser. No. 60/043,099 application is hereby incorporated by reference in its entirety.

BACKGROUND OF THE INVENTION

Marked card readers are well known in the art for use with lottery documents, multiple transaction documents, standardized test forms and the like. These marked card readers are used in conjunction with a substrate of the type having a plurality of data entry regions which are darkened by a pencil thereby making the data entry regions contrast with the areas of the substrate surrounding the data entry regions. The substrate is then placed in data communication with an optical sensing device associated with the reader. A typical prior art marked card reader is disclosed in U.S. Pat. No. 4,578,569 to Arp et al. Disclosed therein is a hand-fed data-card reader compatible with cards of different widths and having a selectively actuable perforator for conveying a card past a reader head and for selectively canceling a desired card by the perforation thereof. Cards are conveyed via a belt/pulley drive train that is operably coupled to a spiked perforate that engages each card at one of two pressures so as to selectively convey the card with or without embossing the surface. More recently, progress has been made with increasing the accuracy of reading information from the substrate.

U.S. Pat. No. 5,711,673 to Grundy, Jr. discloses a method for interpreting a plurality of response marks on a scannable surface that includes an adjustable read level threshold. The adjustable read level threshold enables distinguishing between marks intended to be present on the substrate from marks not intended to be placed on the substrate. A drawback with prior art card reading systems, however, is that the same are expensive to implement.

What is needed, therefore, is a low cost marked card reader which is capable of accurately interpreting information on a substrate.

SUMMARY OF THE INVENTION

A marked card reader features a lensless optical detection system having fixed angle illumination and detection, the sensitivity of which is independent of the frequency response associated therewith. The optical detection system includes a radiation source to produce radiation and a radiation detector. A target plane is positioned so that the radiation source directs radiation toward the target plane. The radiation detector is positioned to sense radiation reflected from the target plane. An optically opaque body is positioned between the optical detector and the radiation source to prevent incident radiation from being sensed by the optical detector. The body includes an aperture disposed proximate to the target plane to allow radiation reflected therefrom to impinge upon the optical detector. The resolution of the optical detector is dependent upon the ratio of a first distance, measured between the optical detector and the aperture, and a second distance, measured between the aperture and the target plane.

A data entry substrate is provided which is adapted to be selectively placed in data communication with the optical detection system by being placed at the target plane. The substrate has a plurality of data entry regions arranged in a plurality of subsets with data entry regions of each of the plurality of subsets being collinear and extending along a line parallel to a longitudinal axis of the substrate. Each of the plurality of data entry regions of a given subset has a weighted value associated therewith that corresponds to operational parameters of the system. The line associated with each of the subsets extends between opposite ends of a sector of the substrate, with a weighted value associated with data entry regions of one of the plurality of subsets being greatest proximate to one of the opposed ends and weighted values associated with the remaining data entry regions of the subset decreasing in magnitude as a function of a distance from the same end. Indicia may be present on the substrate and disposed adjacent to data entry regions reciting the weighted value associated therewith.

In an exemplary embodiment, the card reader is described as being employed with a fluid dispensing system having a plurality of pumps in fluid communication with both the supply of fluids and the washing chamber via a plurality of transfer tubes. The card reader is in data communication with a controller to programmably control the transfer of fluids between a supply of fluids and a washing chamber while allowing retention of a permanent record of the programmed status of the controller. The controller is in data communication with the pumps to regulate operation of the same. In this fashion, control of the transfer of the fluids between the washing chamber and the supply is achieved. The supply of fluids includes water, bleach, fabric softener and various detergents.

In operation, data is entered onto the substrate either by varying the optical contrast of the data entry regions, defining optically varied regions, or by forming an aperture therein, defining punched regions. The combined weighted value associated with each of the sectors of the substrate is dependent upon both the spatial position of the optically varied, or punched, region and the number thereof. After the data has been entered into the data entry regions, the substrate is placed into the card reader. The card reader interprets the data on the substrate and transmits the interpreted data to the controller which then operates on the same to regulate the operational parameters of the system. After the data has been read by the card reader, the substrate may be decoupled from the system and stored remotely at a centralized location.

For a further understanding of the objects and advantages of the present invention, reference should be made to the ensuing detailed description taken in conjunction with the accompanying drawings.

DETAILED DESCRIPTION OF THE PREFERRED EMBODIMENTS

Figure 1:
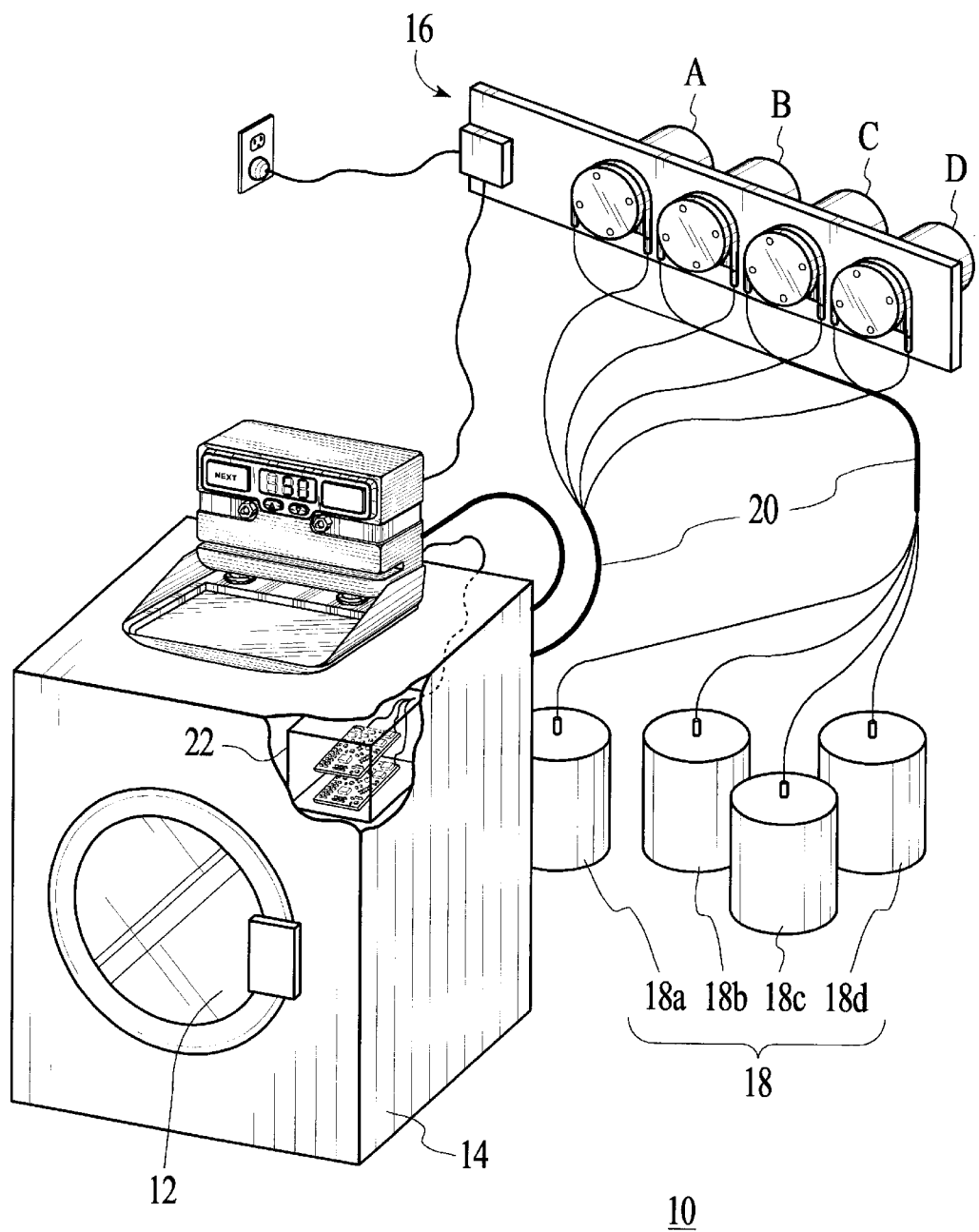
FIG. 1 is a perspective view of a chemical dispensing system in accordance with the present invention.

Referring to FIG. 1, a chemical dispensing system 10 includes a washing chamber 12, which is incorporated into a standard industrial washing system 14 and a plurality of pumps 16 which are coupled to the supply of chemicals 18 and the washing chamber 12 via a plurality of transfer tubes 20. Although any type of pump known in the art may be employed, typically each of the plurality of pumps 16 is a peristaltic pump.

To regulate the operations of the chemical dispensing system 10, a machine interface 22 is in data communication with the plurality of pumps 16. In this fashion, control of the transfer of the chemicals between the washing chamber 12 and the supply 18 is achieved. Although any number of receptacles may be included, depending upon the application, the supply of chemicals 18 includes four receptacles 18a, 18b, 18c and 18d, each of which stores a chemical. In the present example, receptacle 18a contains detergent break, receptacle 18b contains bleach, receptacle 18c contains detergent and receptacle 18d contains fabric softener. The washing system 14 is connected to a supply of water (not shown) such as a municipal water supply. The chemicals may be in either fluid or solid.

Figure 2:
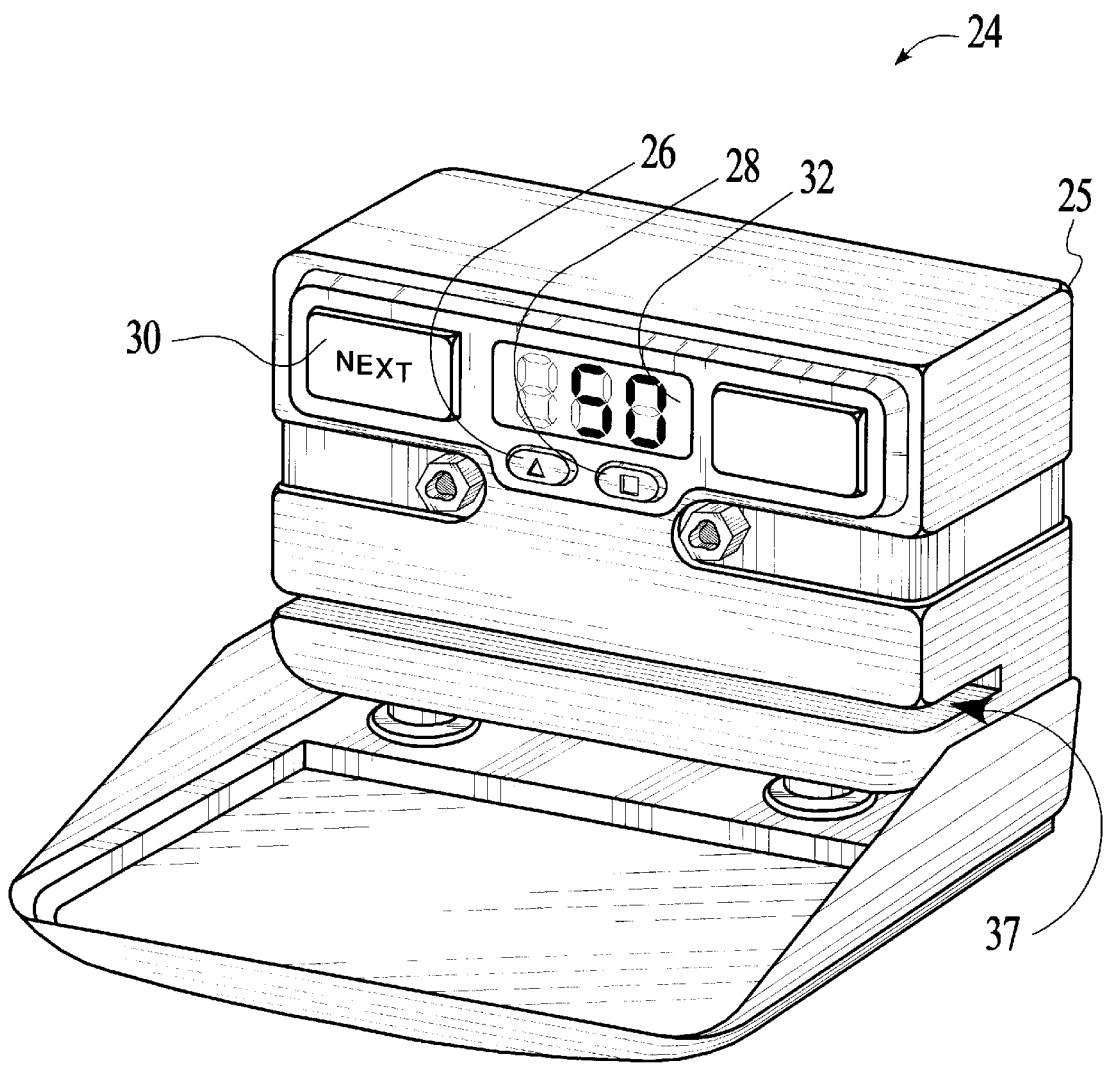
FIG. 2 is a detailed perspective view of a card reader shown above in FIG. 1.

Referring to both FIGS. 1 and 2, a program interface 24 is in data communication with the machine interface 22. The program interface 24 allows programmable control of the system 10 by programming a processor (not shown) contained in a housing 25 having a plurality of data input keys 26, 28, 30 and a display screen 32 mounted therein. Positioned at one edge of the housing 25 is an elongated slot 37 having optical sensing components therein (not shown) which facilitate data input, discussed more fully below. Any type of display may be employed, including, e.g., liquid crystal display, light emitting diodes (LEDs), cathode ray tube and the like. The aforementioned processor is connected to receive signals from the machine interface 22 through an optical interface (not shown) to electrically isolate the processor.

Operating chemical dispensing systems for profit often requires making the system flexible so as provide differing wash formulas, reducing the set-up, or programming time, and making the system friendly for an end user to operate. To that end, the program interface 24 has two operational modes: a user mode and an installer mode. The user mode facilitates selection of formula number and view load counts associated with the system 10. The installer mode facilitates priming and calibration of the plurality of pumps 16, as well as control of recordation of the system's operations, such as resetting of load counters, verification of formula programming and restricting access to the installer mode.

Figure 3:
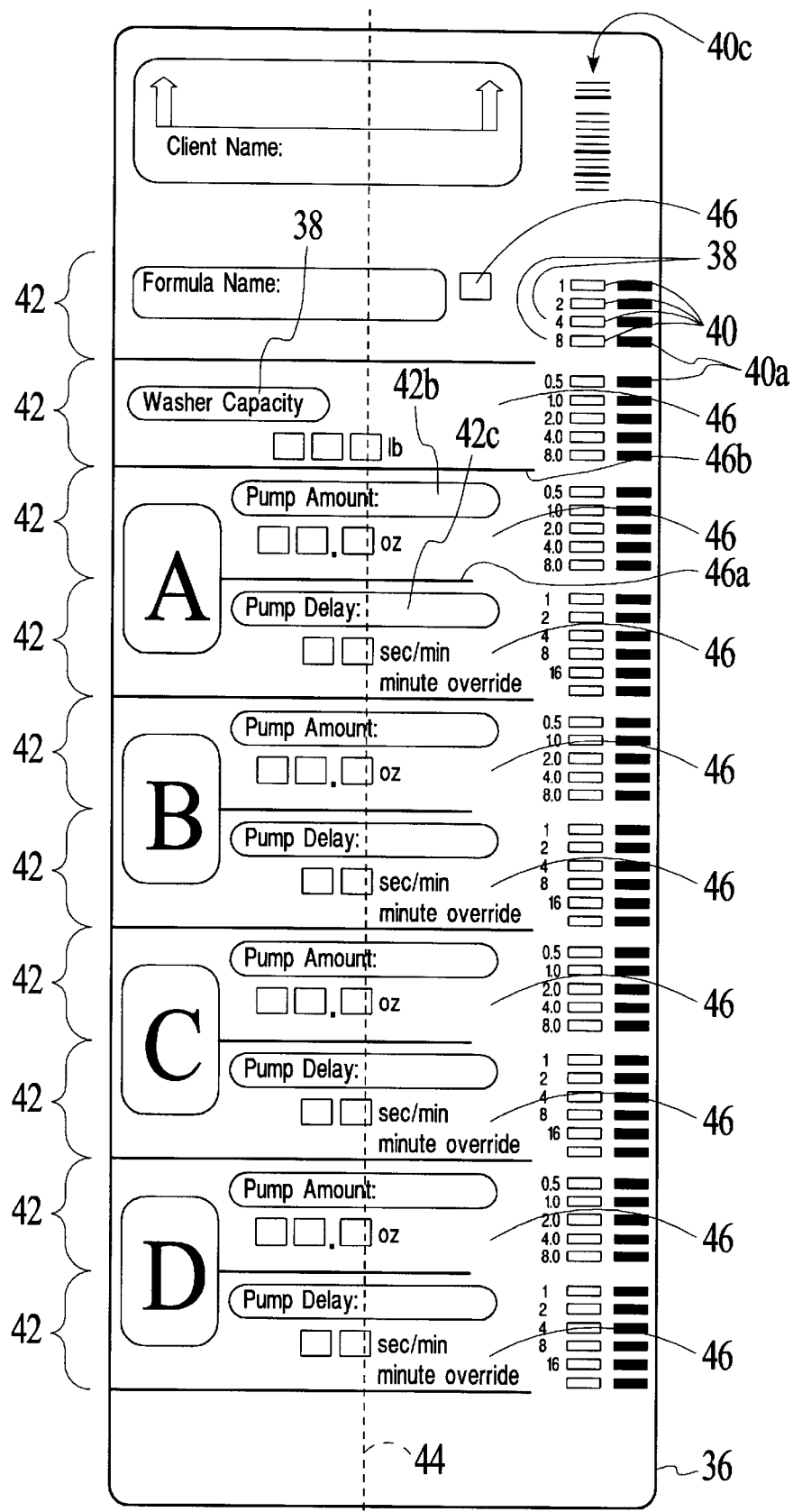
FIG. 3 is a plan view of one side of a data entry substrate which is selectively placed in data communication with the card reader shown above in FIGS. 1 and 2.
Figure 4:
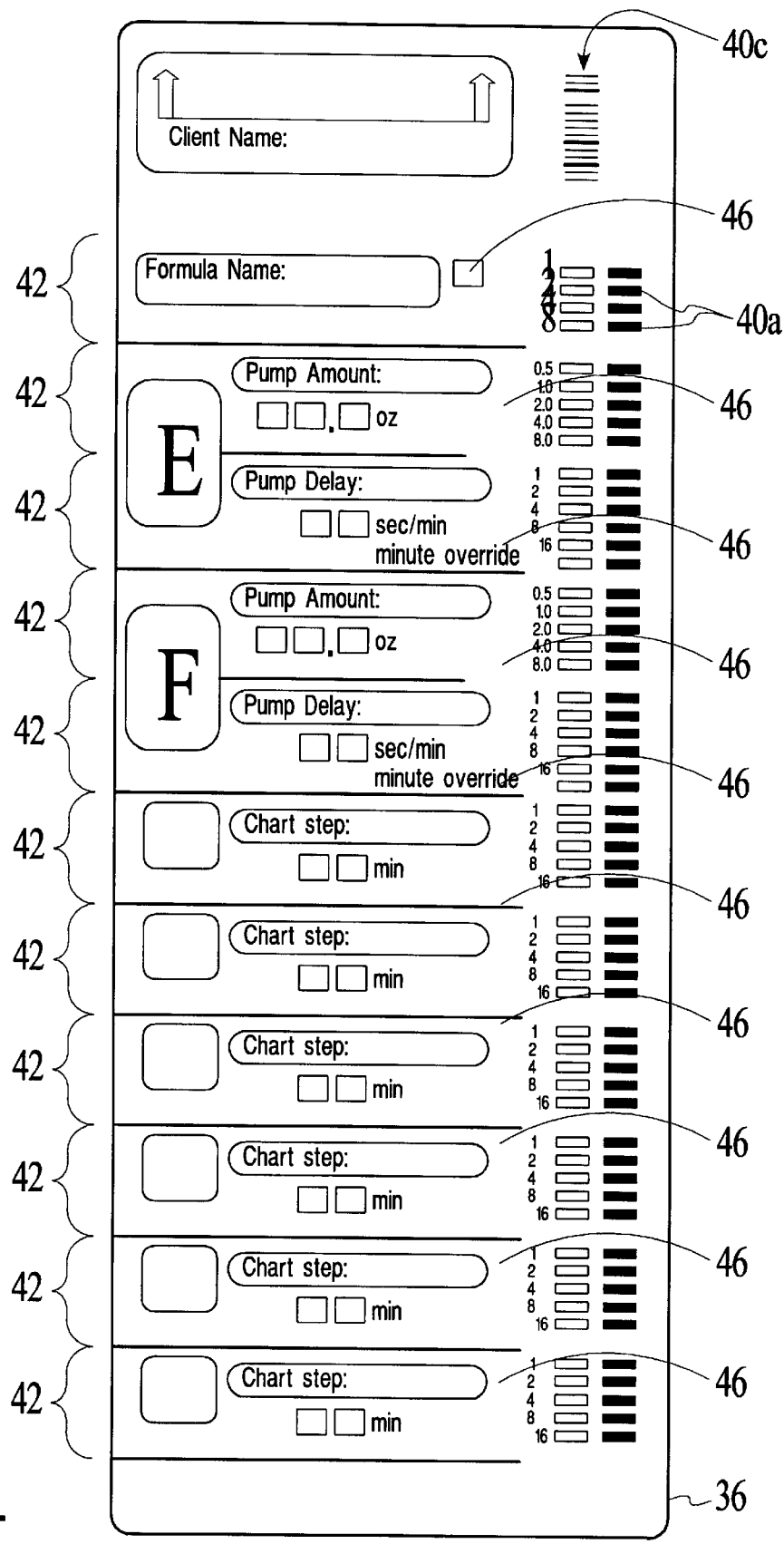
FIG. 4 is a plan view of an opposing side of the data entry substrate shown in FIG. 3.

Referring to FIGS. 2, 3 and 4, the card reader 24 reduces set-up time by allowing detection of data from a data entry substrate 36 that incorporates both instructions, such as indicia 38, and data entry regions 40. Specifically, the data entry substrate 36 is adapted to be selectively placed in data communication with the card reader 24, and the plurality of data entry regions 40 are arranged in a plurality of subsets 42. Typically, the data entry regions 40 of each of the plurality of subsets 42 are collinear, extending parallel to a longitudinal axis 44 of the data entry substrate 36. Each of the plurality of data entry regions 40 of a given subset 42 extends between opposed ends 46a and 46b of a sector 46 and has a weighted value associated therewith. The weighted value associated with a subgroup of the data entry regions corresponds to operational parameters of the system 10, with the weighted value associated with the data entry regions being greatest proximate to one of the opposed ends, such as end 46a. The weighted value associated with remaining data entry regions 40 of a particular subset 42 decrease in magnitude as a function of a distance from the end 46a, i.e., the closer the proximity of a data entry region 40 is to end 46b, the smaller the magnitude of the weighted value associated therewith.

The aforementioned operational parameters include a quantity of chemical to be transferred to the washing chamber 12 and the sequence in which the plurality of pumps 16 will transfer chemicals thereto by establishing a delay before chemical transfer. The delay is measured from a commencement of a washing cycle. For example, subset 42c corresponds to pump A and the weighted values associated with the data entry regions relate to a quantity of chemical pump A is to transfer between receptacle 18a and the washing chamber 12. The data regions 40 recited in subset 42c have the following weighted values 0.5, 1.0, 2.0, 4.0 and 8.0 ounces. Each weighted value is uniquely associated with, and positioned adjacent to, one of the data entry regions 40. Information is entered into the subset 42c by varying the optical properties of the data entry regions 40 so that it contrasts with the area of the substrate surrounding the same. In the present embodiment, information is entered into the subset 42c by darkening one or more of the data entry regions 40 associated therewith, defining an optically contrasted data entry region. The information in a subset corresponds to a total weighted value that is dependent upon both the spatial position and number of optically contrasted data entry regions 40 in the subset 42c. To vary the optical contrast of the data entry regions 40, any one of numerous implements may be used, e.g., a marker, pen, pencil or the like.

Figure 5:
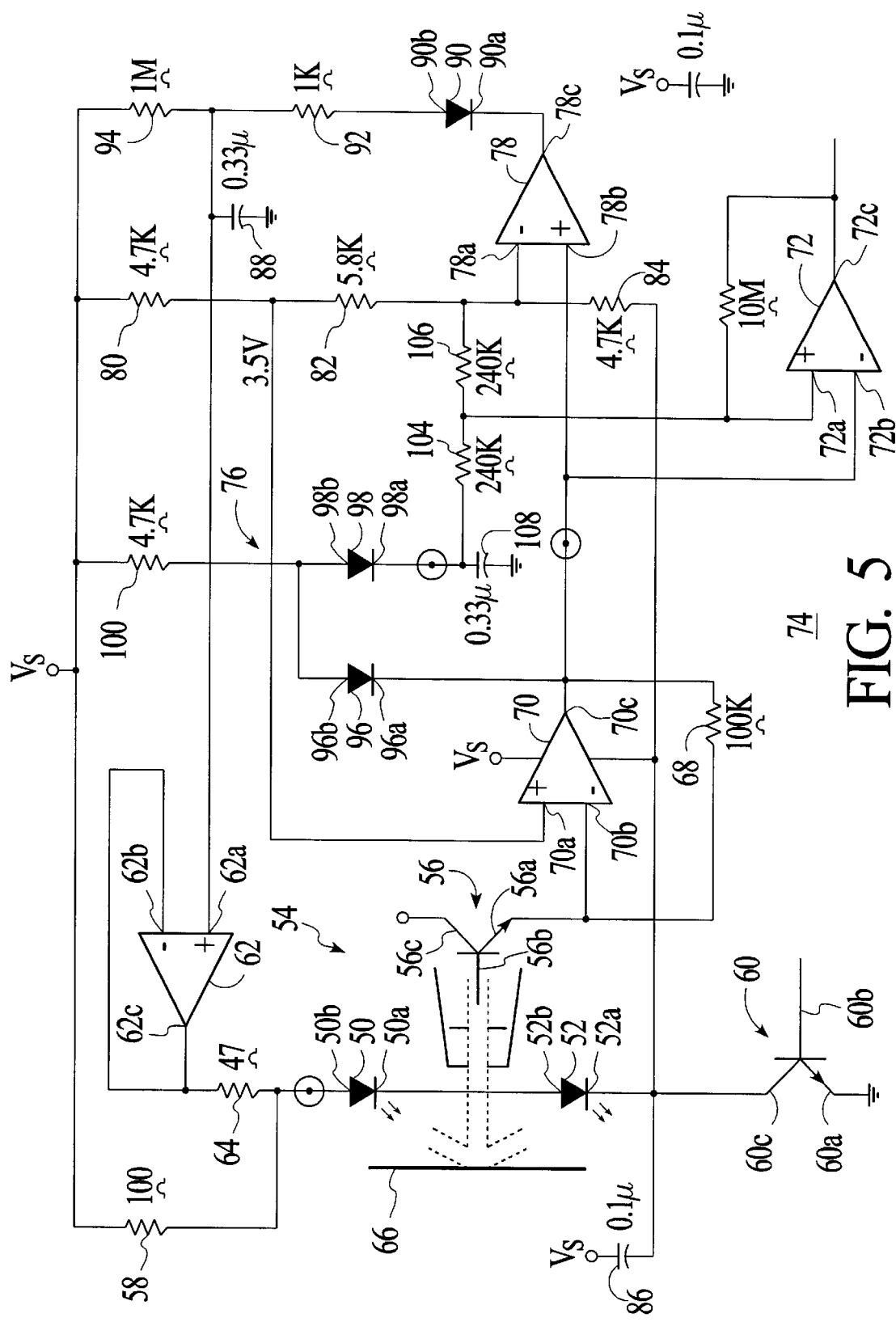
FIG. 5 is a schematic showing the components of the card reader shown above in FIGS. 1 and 2.

Referring to FIGS. 2, 3, and 5, to detect the information programmed into the data entry regions 40, card reader 24 must distinguish between two different levels of reflected radiation and the spatial positions at which a change in the radiation level is detected. This is achieved by having an optical detection system 48 including one or more illumination sources 50 and 52, a spatial filtering system 54, and an optical detector 56. Although any type of illumination source may be employed, typically illumination sources 50 and 52 include light emitting diodes (LEDs), with a cathode 50a of one coupled to the anode 52b of the other. The anode 50b of illumination source 50 is coupled to a supply voltage $V_S$ through a resistor 58, and a cathode 52a of illumination source 52 is connected to a collector 60c of a transistor 60, which functions as the on/off switch of the card reader 24. The emitter 60a of transistor 60 is connected to ground and the base 60b is connected to activations circuit (not shown).

The illumination sources 50 and 52 are driven by an operational amplifier 62 having unity gain. Specifically, the output 62c of the drive amplifier 62 is connected to the anode 50b of illumination source 50 through a resistor 64. The inverting input of the drive amplifier 62 is connected to the output 62c thereof. The non-inverting input 62a of the drive amplifier 62 is connected to a filtering circuit, discussed more fully below.

The optical detector 56 is of a type sufficient to detect the optical radiation emitted by the illumination sources 50 and 52. Typically, the optical detector 56 is a photosensitive transistor. A target plane 66 is defined by one edge of the slot 34 and positioned adjacent to optical detection system 48. The data entry substrate 36 is positioned adjacent to the target plane 66 and the radiation emitted by the illumination sources 50 and 52 is incident thereon, with radiation reflected therefrom impinging upon the optical detector 56.

The optical detector 56 includes an emitter 56a, a base 56b and a collector 56c, with the base 56b functioning as the optical detector. The collector 56c is connected to a supply voltage $V_s$. The optical sensor 56 produces a current in response to detecting radiation. The current is converted to a voltage by passing the current through a resistor 68 connected to the emitter 56a. The voltage is coupled to an inverting input 70a of an operational amplifier 70. Voltage present at the inverting input 70a is transmitted to the output 70c of the detector amplifier 70. The signal at the output 70c is sensed by the inverting input 72b of an output operational amplifier 72. If the signal at the inverting input 72b is above a predetermined threshold level, the same is transmitted to the output 72c as information which is interpreted by the controller (not shown).

To accurately read information from the data entry substrate 36, two filtering circuits 74 and 76 are coupled between the output 70c of the detector amplifier 70 and the inputs 72a and 72b of the output amplifier 72. High level radiation filter 74 prevents a signal from being present on the output 72c when high level of radiation is detected by the optical detector 56. To that end, the high level radiation filter ensures that the voltage levels at both the inputs 72a and 72b are substantially equal. This is achieved by connecting a non-inverting input 78a an operational amplifier 78, employed as a high level radiation detector, to the output of the detector amplifier 70. The inverting input 78b of the high level radiation detector 78 is set to about 1.5 volt with a resistive divider network consisting of 80, 82, and 84 which are coupled in series. Specifically, resistor 82 is connected between resistors 80 and 84, with both resistors 82 and 84 connected in common with the inverting input 78b. A side of resistor 80, opposite to resistor 82, is connected to the supply voltage $V_s$. A side of resistor 84, opposite to resistor 82, is connected in common with a capacitor 86 and the anode 52a of LED 52. A side of the capacitor 86, opposite to resistor 84 is connected to the supply voltage $V_s$.

Whenever a level of radiation detected by the optical detector 56 increases, the output of the detector amplifier 70 goes below 1.5 volts, i.e., exceeds the 1.5 volt threshold of the high level radiation amplifier 78. This produces a negative potential at the output 78c of the high level radiation detector 78. This results in the charging of a capacitor 88, coupled thereto, through a diode 90 connected thereto in series with a resistor 92, with the cathode 90a of the diode 90 being connected to the output 78c. In this fashion, the voltage on the capacitor 88 is forced down whenever the light level detected results in the voltage level on input 78a going below the 1.5 volt threshold.

The voltage level charge status of the capacitor 88 regulates the operation of the drive amplifier 62. Specifically, the non-inverting input 62a of the drive amplifier 62 is connected to one side of capacitor 88, with the opposite side of the capacitor 88 being connected to ground. If the radiation sensed by optical detector 56 goes above a preset level, i.e., the voltage sensed by the non-inverting input 62a of the drive amplifier 62 is reduced, thereby reducing the brightness of the illumination sources 50 and 52. In this manner, high level radiation filter 74 functions as an automatic gain control. To ensure that the voltage levels at the inputs 72a and 72b of the output amplifier 72 are equal which the optical detector 56 senses an increase in radiation, the filter charges the capacitor 88, to a negative voltage, much more rapidly than discharge of the same occurs. To that end, a resistor 94 is coupled so that one side is connected in common with both resistor 92 and capacitor 88. The remaining side of the resistor 94 is connected to the voltage supply $V_s$. The aforementioned temporal relationship between charge and discharge of the capacitor 88 is achieved by having the value of resistor 94 being much greater than the value of resistor 92.

To reduce the probability that the low radiation level signal is interpreted as a high radiation level signal, the low radiation level filter 76 is configured to detect the darkest signal present. In this fashion, problems with reflectivity of ambient light from the darkened areas of the substrate 36 are avoided. Such light may be interpreted as being high level radiation. The darkest signal present is detected by connecting together the anodes 96b and 98b of two diodes 96 and 98 to one side of a resistor 100 with the opposite side connected to the supply voltage $V_s$, and the cathode 96a of diode 96 connected to the output 70c. The cathode 98a of diode 98 is connected to one side of a capacitor 102 and a resistor 104. The opposite side of the capacitor 108 is connected to ground, and the opposite side of resistor 104 is connected to resistor 106. The side of the resistor 106, opposite to resistor 104, is connected to the inverting input 78b and, therefore, is held at 1.5 volts. In this configuration, as voltage on output 70c goes higher, capacitor 102 will follow, because the diodes 96 and 98 are balanced. Discharge of the capacitor 102 is through resistors 104 and 106. In this fashion, the capacitor 108 quickly charges to a positive voltage, but discharges much more slowly than it charges.

A problem was encountered due to the conflicting parameters of the sensitivity and frequency response of the optical detector 56. Specifically, it was discovered that the sensitivity of the optical detector is proportional to the value of the resistor 68, but the frequency response of the same was inversely proportional. As a result, optical sensitivity could be achieved by employing a resistor having a value approximately 100K ohms, but the frequency response of the optical detector 56 was restricted. This resulted in erroneous readings of a data entry substrate 36 which is scanned passed the optical sensor 54 at moderate speeds. To avoid the aforementioned problem, the detector amplifier 70 is employed having the feedback resistor 68 coupled between the input 70b and the output 70c with the emitter 56a of the optical detector 56 coupled to input 70b. This structure allows the sensitivity of the optical sensor 54 to be established independent of the frequency response of the same, i.e., the benefit of the full gain afforded by resistor 68 may be obtained without substantial loss in frequency response.

Figure 6:
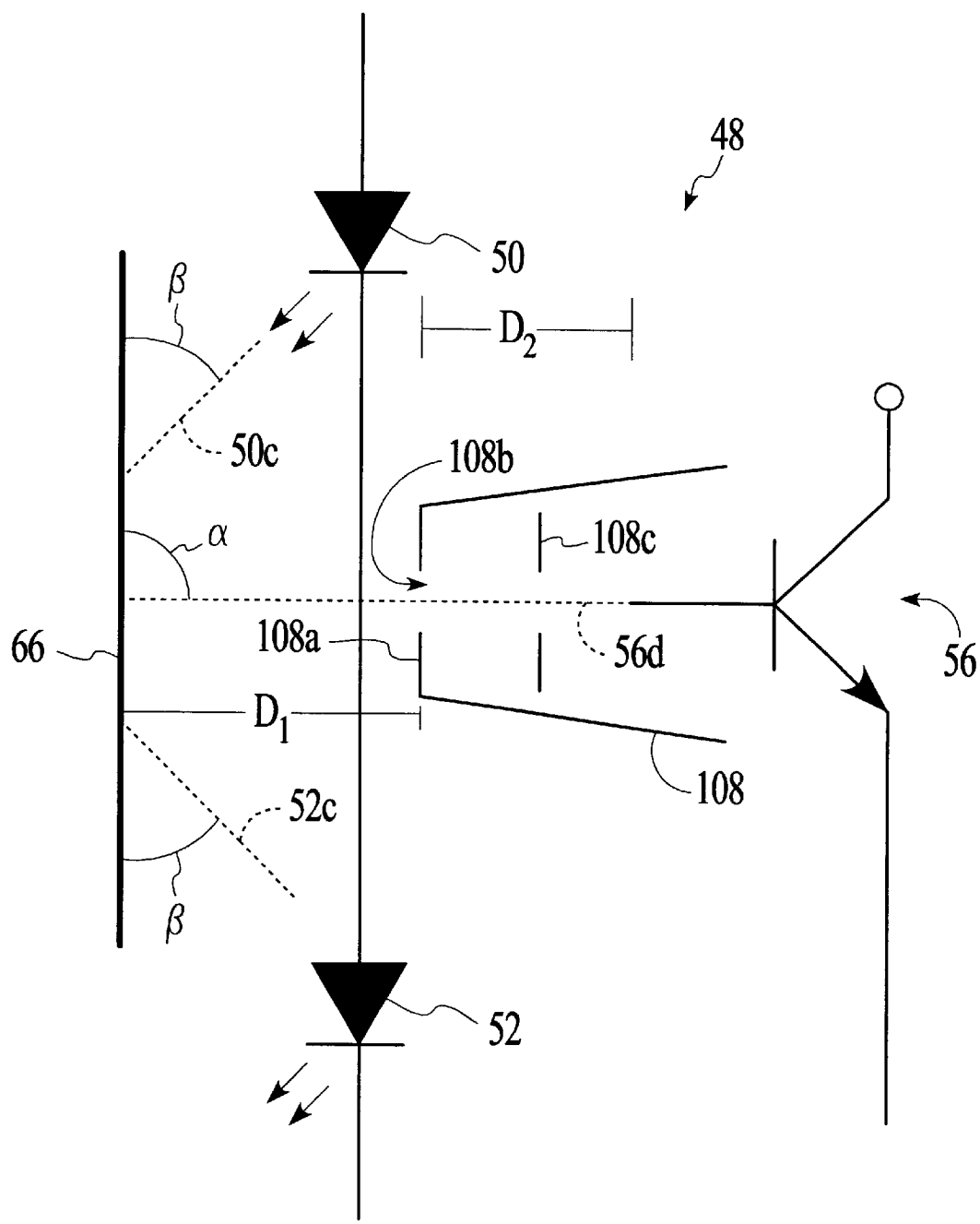
FIG. 6 is a detailed schematic view of an optical detection system shown in FIG. 5.
Figure 7:
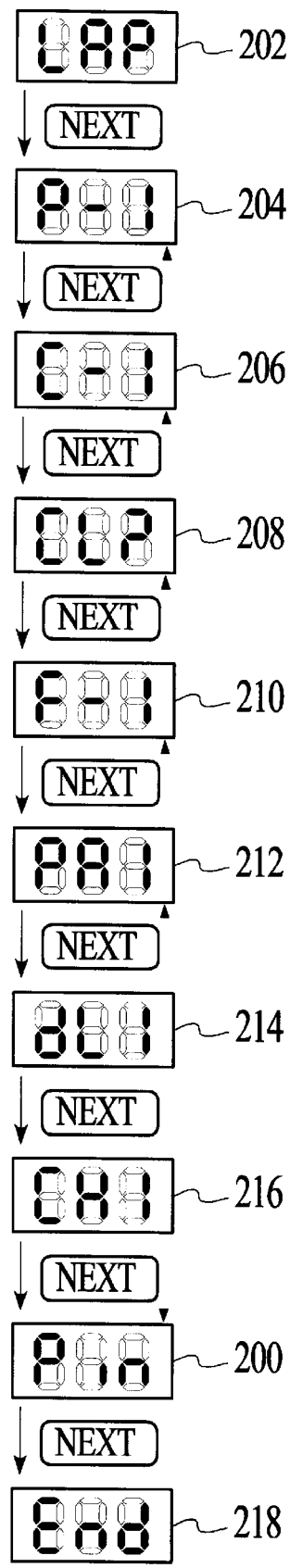
FIG. 7 is a plan view of various screens shown on a display of the card reader shown in FIG. 2.

Referring to FIG. 6, to minimize the cost of the optical detection system 48, the need for lenses was abrogated, while making the same suitable for detection of information inserted by various implements, as discussed above. However, a problem was encountered with one of the most common implements. Specifically, it was found that if the illuminating radiation impinged upon pencil marks, secularly reflected radiation would be produced which prevented detection of the information were the detection angle α is equal to the illumination angle β. The detection angle α is measured between an optical axis 56d of the optical detector 56 and the target plane 66. The illumination angle β is measured between one of the optical axes 50c and 52d of the illumination sources 50 and 52, respectively, and the target plane. To avoid this problem the illumination sources 50 and 52 and the optical detector 56 are positioned with respect to the target plane 66 to ensure that the angle detection angle α is not equal to the illumination angle β. To that end, radiation is directed toward the target plane 66 at an oblique angle. Although the illumination angle β and the detection angle α may be virtually any two angles, so long as they are not equal, typically illumination angle β is approximately 45° with respect to the target plane 66. The detection angle a is typically 90° with respect to the target plane 66.

To reduce the probability that the optical detector 56 detects non-reflected radiation, the same is isolated from incident radiation from the illumination sources 50 and 52 by an optically opaque body 108. The body 108 is formed from a malleability inexpensive metal, such as brass, which is darkened by a process known to those skilled in the art. At the end of the shield 108, positioned proximate to the target plane 66, is a terminus 108a having an aperture 108b formed therein. The shape of the aperture 108b is selected so that the optical detector 56 senses an elongated line of reflected radiation, a longitudinal axis of which extends parallel to the longitudinal axis of each of the data regions 40. This was found to produce the best resolution for detecting the data regions, with the best resolution being defamed as follows:

$$\text{resolution} = [a(D_2/D_1)] + W$$

where "a" is the area of the slit along the longitudinal axis, "$D_2$" is the distance between the optical detector 56 and the aperture 108b, "$D_1$" is the distance between the aperture 108b and the target plane 66 and W is the area of the optical detector 56. Although an optical lens may be employed to focus reflected light on the optical detector 56, it greatly increases the cost of the optical detection system 48 and is not preferred. Finally, to increase the resolution of the optical detector 56, the opaque body 108 may include a spatial filter 108c positioned between the aperture 108b and the optical detector 56. The spatial filter 108c has an aperture with an area slightly smaller than the area of the optical sensing portion of the optical detector 56, with the aperture disposed in the optical axos 56d.

Referring to FIGS. 3 and 5, in operation, data is entered onto the data entry substrate 36 substrate by darkening the desired data regions 40. The data entry substrate 36 is then inserted into the slot 34 so that the data entry regions 40 face the illumination sources 50 and 52. The substrate is then slid along a direction, thereby scanning the card across both of the illumination sources 50 and 52 as well as the optical detector 56. In this fashion, all information entered into the data entry regions 40 is read by the optical detection system 48. Signals are generated by the detector amplifier 70 indicating the detection of both high level radiation and low level radiation. The high level radiation is associated with data regions 40 not containing information, as well as regions of the substrate located outside of the data entry regions. The low level radiation is associated with data entry regions 40 containing information therein, i.e., optically contrasted data entry regions 40. To facilitate movement of the data entry substrate 36, a felt pad may be disposed in the slot 34. A optically transparent shield may be positioned between the slot and the optical detector 56 to prevent contamination of the same.

The weighted value associated with the data entry regions 40 may be determined by including adjacent to each of the data entry regions, an index mark 40a. In this fashion, an index region 40b is formed on one of edge of the data substrate 36. The index region may be sensed by a second optical detection system (not shown). In this manner, information concerning the index marks is transmitted to the controller which interprets the information to determine the sector 46 and the weighted value associated with a particular data entry region 40. Typically, the data entry substrate 36 will have header information 40c associated therewith. The header information 40c can include the type of machine being programmed, the units which are being employed, e.g., metric or English standard units and any other information deemed necessary. The header information 40c will be associated with a predetermined number of data entry regions. After detecting the predetermined number of data entry regions, the controller will interpret all subsequent information from the data entry substrate, as discussed above. Alternatively, the header information may simply be bar encoded information which would be sensed by an bar code reader known to one skilled in the art.

Referring to FIGS. 1, 2, 7 and 10, to configure the system 10, an installer depresses and holds button 28 for approximately two seconds to obtain the password input screen 200. Button 26 is employed to select the proper input code. Button 30 is employed to select a different digit. This process is repeated for each digit on the display 32. The default password is 123. The card reader 24 will return to User Mode after 10 seconds of inactivity.

After entering the password, the display 24 will automatically provide a visual representation of the system capacity screen 202 every two seconds. The system capacity screen indicates the programmed capacity of the system 10, which is used to scale actual pump quantity when reading the information concerning the same from the data entry substrate 36.

To prime pumps 16, button 30 is depressed to select the prime pump screen 204. To select the proper value of a digit on the display 32, i.e., pump number, button 26 is depressed. Button 28 is depressed to start the pump and depressed again to stop the pump. These steps are repeated for all desired pumps.

Calibration of the pumps 16 is achieved by depressing button 30 to obtain calibration screen 206. Every two seconds the display 32 toggles back and forth between visual representations indicating a pump number and a pump calibration time. Button 26 is depressed to select the pump number to be calibrated. As before, button 28 is depressed to activate the pump selected and depressed again to deactivate the pump. Each of the pumps 16 is calibrated in this fashion.

To view and/or reset load counters, button 30 is depressed to obtain load counter screen 208. Every two seconds the screen 208 displays total load counts for all formulas. Button 28 is depressed to reset the load counters.

The formula which is employed in the system 10 is verified by depressing the button 30 to obtain the formula screen 210. Button 26 is depressed to sect the formula to be verified. Every two seconds the display 32 toggles back and forth between visual representations of the formula number and the status of the last read of a data entry substrate 36. A visual representation of cd1 indicates that most recent card read was side 1, and a visual representation of cd2 indicates that most recent card read was side 2. Err indicates a card read error. Depress button 28 to verify information read from the data entry substrate 36. Depress button 26 to step through all sector 46 of both sides of the most recently read data entry substrate 36. Depress button 28 to exit the data entry substrate 36 review function.

To view and/or test run scaled pump amounts for the formula number selected above, depress button 30 to select the screen display 212. Depress button 26 to select the pump number to be tested. Every two seconds the display 32 toggles back and forth between visual representations of the pump number and scaled pump quantity. Depressing button 28 activates the selected pump. To deactivate the selected pump before the aforementioned quantity is transferred, depress button 28 otherwise, the pump automatically deactivates.

To view the pump delay time, for the formula number selected when formula verify screen 210 is displayed, depress button 30 until screen 214 is displayed. Button 26 is employed to select the pump desired. Every two seconds the display 32 toggles back and forth between visual representations of the pump number and delay time in minutes or seconds. Delay Times in minutes are indicated with a decimal point between the middle and right digits.

A visual representation of a chart stop time screen 216 is displayed by using button 30. Button 26 is employed to change between pumps to view the chart stop times associated therewith. Every two seconds the display 32 toggles back and forth between visual representations of the pump number and the chart stop time in minutes.

Finally, the installer mode is exited by using button 30 to provide a visual representation of the end screen 218. Button 28 is then depressed to exit the installer mode.

Although the forgoing discussion has been directed to an optical card reader, it should be understood that a mechanical card reader of the type to read information corresponding to apertures formed in the data entry substrate may be employed. Moreover, the card readers described above may be employed in other types of vending machines, including laundry dryers and food dispensing machines. Therefore, the invention should not be determined with reference the description, but instead from the claims attached hereto along with the full scope of equivalents thereof.

What is claimed is:

1. A marked card reader for reading a data entry card of the type having a first surface with predefined regions thereof containing related areas of contrasting optical reflectivity encoding preselected data, and a second opposite surface, comprising:

a slot adapted to slideably receive said data entry card to be read by the marked card reader, a portion of said slot comprising a fixed optical target plane adjacent said second opposite surface of said card;

a first optical radiation source to produce incident optical radiation on said first surface of said card in said predefined regions, said optical radiation source having a fixed first optical axis extending toward said target plane at a preselected first oblique angle with respect to said target plane;

a second optical radiation source to produce incident optical radiation on said first surface of said card in said predefined regions, said second optical radiation source having a fixed second optical axis extending toward said target plane at a preselected oblique angle with respect to said target plane;

an optical radiation detector to detect said incident optical radiation reflected from said first surface of said card, said optical radiation detector having a fixed third optical axis extending toward said target plane at a preselected third angle with respect to said target plane, said third angle not equal to said first or second oblique angles;

an optically opaque body interposed between said optical radiation detector and said target plane, said optically opaque body having a first aperture disposed along said second optical axis to facilitate communication of said incident optical radiation directly reflected from a selected area of said first surface of said card including at least a portion of said predefined regions to said optical radiation detector and to reduce communication of non-reflected optical radiation to said optical radiation detector; and an a focal spatial filter internal to said optically opaque body positioned between said first aperture and said optical radiation detector, said a focal spatial filter disposed along said third optical axis and sized and positioned to improve the resolution of the optical radiation detector.

2. The marked card reader of claim 1 wherein the oblique angles, of said first and second optical axes with respect to such target plane are approximately equal.

3. The marked card reader of claim 2 wherein said the oblique angles of said first and second optical axes with respect to said target plane are approximately 45 degrees.

4. The marked card reader of claim 2 wherein said third optical axis is approximately perpendicular to said target plane.

5. The marked card reader of claim 1 wherein said optically opaque body includes light absorption means for absorbing incident optical radiation reflected from said first surface of said card not directly along said third optical axis.

6. The marked card reader of claim 1 herein said a focal spatial filter comprises a second aperture spaced from said first aperture along said third optical axis for communicating said optical radiation directly reflected from said selected area of said first surface of said marked card through said first aperture to said optical radiation detector.

7. The marked card reader of claim 1 wherein said first aperture is shaped to communicate an elongated line of reflected incident optical radiation from said first surface to said optical radiation detector.

8. The marked card reader of claim 7 wherein each of said first and second apertures has an area and wherein the area of the second aperture is slightly less than the area of the first aperture to facilitate directing said reflected incident optical radiation on said optical radiation detector.

9. The marked card reader of claim 1 further comprising:

optical detection circuitry in electrical communication with said first and second optical radiation sources and said optical radiation detector, said circuitry including a low level radiation filter that responds to low levels of reflected incident optical radiation on said optical radiation detector below a predetermined threshold while rejecting higher levels of reflected incident radiation, and a high level radiation filter that responds to high levels of reflected incident optical radiation on said optical radiation detector above a predetermined threshold to reduce the level of optical radiation produced by said optical radiation sources.

10. The marked card reader of claim 1 wherein said optical radiation detector has both an optical sensitivity parameter and a frequency response parameter, and firther comprising optical detection circuitry in electrical communication with said optical radiation detector for independently setting the two parameters.

11. The marked card reader of claim 10 wherein said circuitry comprises a detector amplifier having a resistive feedback loop, the resistive value of said feedback loop determining the optical sensitivity and frequency response of said optical radiation detector.

12. The marked card reader of claim 11 wherein the value of said resistive feedback loop is selected to simultaneously provide sufficient optical sensitivity to discriminate between pencil-marked and non-pencil marked regions of said first surface of said card and sufficient frequency response to make such discrimination while said card is slideably received in said slot at moderate speed.

13. The marked card reader of claim 1 in a programmable fluid dispensing system, comprising:

a plurality of supplies of fluids;

a chamber in fluid communication with said plurality of supplies;

a plurality of pumps, each in fluid communication with one of said plurality of supplies;

a controller in data communication with said optical radiation detector, said chamber and said pumps for receiving data read from a marked card via said optical radiation detector, and responding thereto to control said pumps to regulate a transfer of said fluids between said supplies and said chamber.

14. The marked card reader of claim 1 including a second optical radiation source and a second optical radiation detector arranged to read a selected area of said card as optical index marks indicative of the location and weight of associated encoded data regions on said card.

15. A marked card reader for reading data optically encoded as marks on a data entry card, comprising:

a first optical radiation source for producing incident optical radiation on a portion of said card at a first fixed angle;

a second optical radiation source for producing additional incident optical radiation on said portion of said card at a second fixed angle;

an optical radiation detector for detecting incident optical radiation directly reflected from said portion of said card at a third fixed angle and converting the same to corresponding electrical signals;

an optical body interposed between said card and said optical radiation detector having optical characteristics to selectively communicate incident optical radiation directly reflected from said portion of said card along said third angle to said optical radiation detector, and to selectively inhibit communication of other optical radiation to said optical radiation detector; and an a focal spatial filter interposed between said card and said optical radiation detector, said a focal spatial filter cooperating with said optical body to direct said incident optical radiation directly reflected from said portion of said card on said optical radiation detector.

16. The marked card reader of claim 15 herein said first and second angles are oblique and said third angle is not equal to said first or second angle.

17. The marked card reader of claim 15 wherein said optical body includes means for absorbing optical radiation not directly reflected from said portion of said card along said third angle.

18. The marked card reader of claim 15 wherein said a focal spatial filter is interposed between said optical body and said optical radiation detector.

19. The marked card reader of claim 18 wherein said optical body includes a first aperture having a first area and said a focal spatial filter has a second aperture having a second area slightly less than first area.

20. The marked card reader of claim 15 further comprising circuitry for processing said electronic signals to control the operation of a programmable fluid dispensing system comprising:

a plurality of fluid supplies;

a chamber in communication with said fluid supplies;

a plurality of pumps in communication with said fluid supplies and said chamber; and a controller responsive to said circuitry for causing said pumps to transfer selected volumes of selected fluids at selected times from said plurality of fluid supplies to said chamber.

* * * * *

UNITED STATES PATENT AND TRADEMARK OFFICE
CERTIFICATE OF CORRECTION

PATENT NO. : 6,299,066 B1
DATED : October 9, 2001
INVENTOR(S) : Howland et al.

Page 1 of 1

It is certified that error appears in the above-identified patent and that said Letters Patent is hereby corrected as shown below:

Column 10,
Line 9, delete "a focal" and substitute therefor -- afocal --
Line 11, delete "a focal" and substitute therefor -- afocal --
Line 33, delete "1" and substitute therefor -- 6 --
Line 57, delete "firther" and substitute therefor -- further --

Column 12,
Line 6, delete "a focal" and substitute therefor -- afocal --
Line 7, delete "a focal" and substitute therefor -- afocal --
Lines 18 & 19, delete "a focal" and substitute therefor -- afocal --
Line 23, delete "a focal" and substitute therefor -- afocal --

Signed and Sealed this

Fourteenth Day of May, 2002

*Attest:*

JAMES E. ROGAN
*Attesting Officer* *Director of the United States Patent and Trademark Office*